US009749618B2

(12) United States Patent
Shintani

(10) Patent No.: US 9,749,618 B2
(45) Date of Patent: *Aug. 29, 2017

(54) 3D TV GLASSES WITH TV MODE CONTROL

(71) Applicant: Sony Corporation, Tokyo (JP)

(72) Inventor: Peter Rae Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 399 days.

This patent is subject to a terminal disclaimer.

(21) Appl. No.: 13/661,720

(22) Filed: Oct. 26, 2012

(65) Prior Publication Data

US 2013/0050451 A1 Feb. 28, 2013

Related U.S. Application Data

(63) Continuation of application No. 12/660,988, filed on Mar. 9, 2010, now Pat. No. 8,370,873.

(51) Int. Cl.
*H04N 13/04* (2006.01)

(52) U.S. Cl.
CPC ..... *H04N 13/0454* (2013.01); *H04N 13/0438* (2013.01); *H04N 2213/008* (2013.01)

(58) Field of Classification Search
CPC .......... H04N 13/0438; H04N 13/0454; H04N 2213/008; H04N 13/007
See application file for complete search history.

(56) References Cited

U.S. PATENT DOCUMENTS

| 4,734,756 A | 3/1988 | Butterfield et al. |
| 4,943,852 A | 7/1990 | Femano et al. |
| 2002/0092021 A1* | 7/2002 | Yap ...................... G11B 27/034 725/55 |
| 2005/0066165 A1 | 3/2005 | Peled et al. |
| 2006/0061652 A1 | 3/2006 | Sato et al. |
| 2006/0095937 A1* | 5/2006 | Knudson ............... G06F 3/0482 725/45 |
| 2006/0139448 A1 | 6/2006 | Ha et al. |
| 2007/0229396 A1 | 10/2007 | Rajasingham |
| 2007/0263003 A1 | 11/2007 | Ko et al. |
| 2008/0101767 A1 | 5/2008 | Oshima et al. |
| 2008/0297671 A1 | 12/2008 | Cha et al. |

(Continued)

FOREIGN PATENT DOCUMENTS

| EP | 2352302 A1 | 8/2011 |
| JP | 2000004453 A * | 1/2000 |

OTHER PUBLICATIONS

English Machine Translation of Junji et al. (JP 2000004453 A).*
Anonymous, "E-D Wireless 3D Glasses for the PC," eDiminsional Inc., Jul. 4, 2008 (per Wayback machine on date printed).

*Primary Examiner* — Mohammed Jebari
(74) *Attorney, Agent, or Firm* — John L. Rogitz

(57) ABSTRACT

A method of operation of three dimensional (3D) stereoscopic television consistent with certain implementations involves turning on or installing a set of 3D glasses on a viewer to cause the set of 3D glasses to enter an active operational mode; and at the 3D glasses, emitting a signal to the television that causes the television to switch from a 2D display mode to a 3D display mode. This abstract is not to be considered limiting, since other embodiments may deviate from the features described in this abstract.

20 Claims, 3 Drawing Sheets

(56) References Cited

U.S. PATENT DOCUMENTS

| | | |
|---|---|---|
| 2009/0091708 A1 | 4/2009 | Greene |
| 2009/0237494 A1* | 9/2009 | Oota ..................... G03B 35/08 348/51 |
| 2009/0322861 A1 | 12/2009 | Jacobs et al. |
| 2010/0157025 A1* | 6/2010 | Suh et al. ..................... 348/51 |
| 2010/0157425 A1* | 6/2010 | Oh ............................. 359/464 |
| 2010/0201790 A1* | 8/2010 | Son ................... G02B 27/2264 348/53 |
| 2011/0090304 A1* | 4/2011 | Song .................. H04N 21/816 348/42 |
| 2011/0164122 A1 | 7/2011 | Hardacker |
| 2011/0199463 A1 | 8/2011 | Gallagher et al. |

* cited by examiner

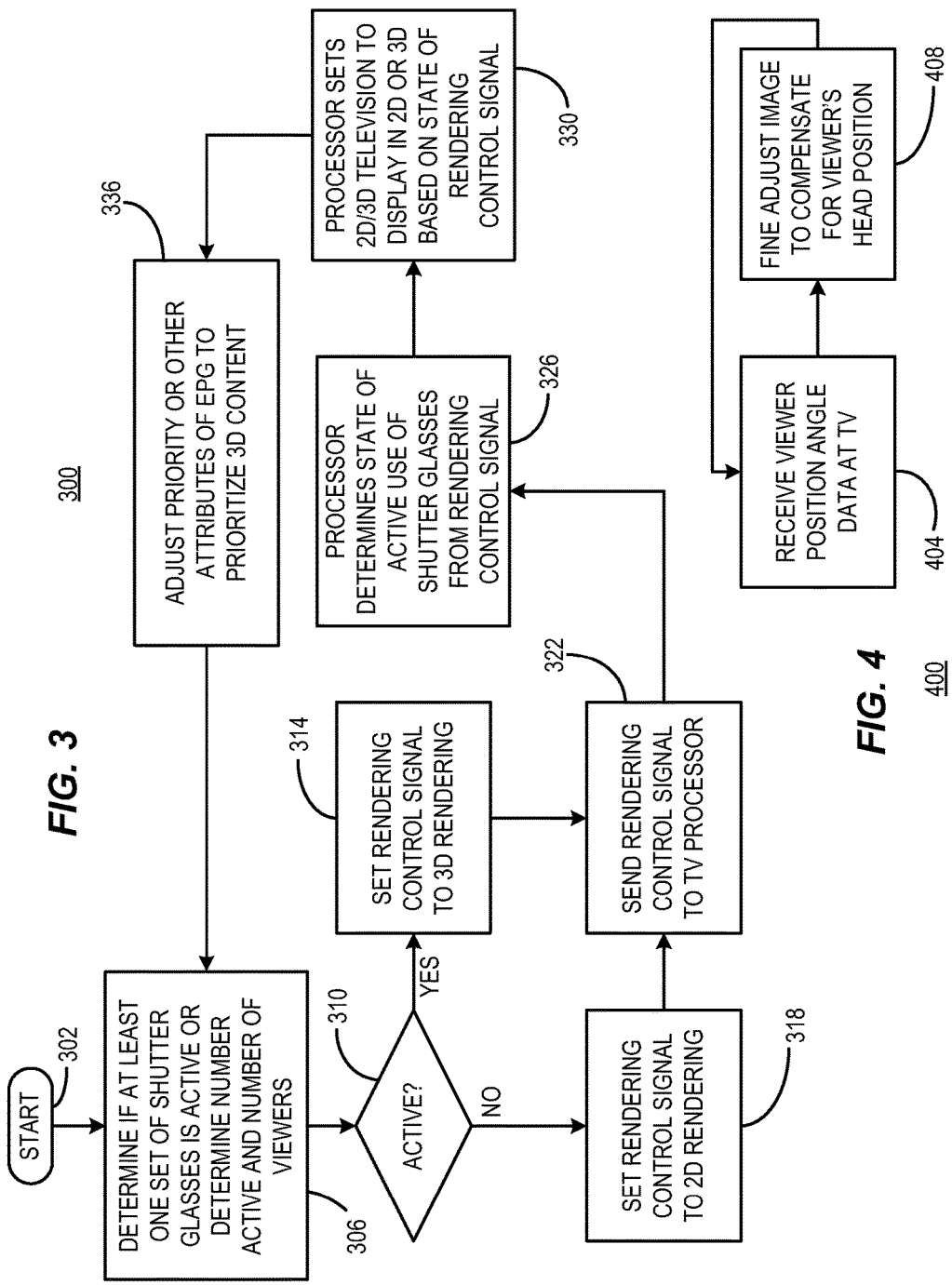

3D TV GLASSES WITH TV MODE CONTROL

CROSS REFERENCE TO RELATED DOCUMENTS

This application is a continuation of U.S. application Ser. No. 12/660,988 filed Mar. 9, 2010, now U.S. Pat. No. 8,370,873, issued Feb. 5, 2013 which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Three dimensional (3D) television (TV) is currently emerging as the newest television innovation. 3D TV utilizes either active shutter glasses or passive glasses with polarization or coloration in order to separate the images presented on a TV display into left eye and right eye images. Passive glasses generally have no active circuitry and no power source. This simulates a three dimensional effect by taking advantage of stereoscopic vision and separate images to the left and right eyes that simulate a three dimensional display experience.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 3 is an example process carried out in the 3D TV in a manner consistent with certain embodiments of the present invention.

FIG. 4 is an example process for viewer position compensation consistent with certain embodiments of the present invention.

DETAILED DESCRIPTION

Figure 1:
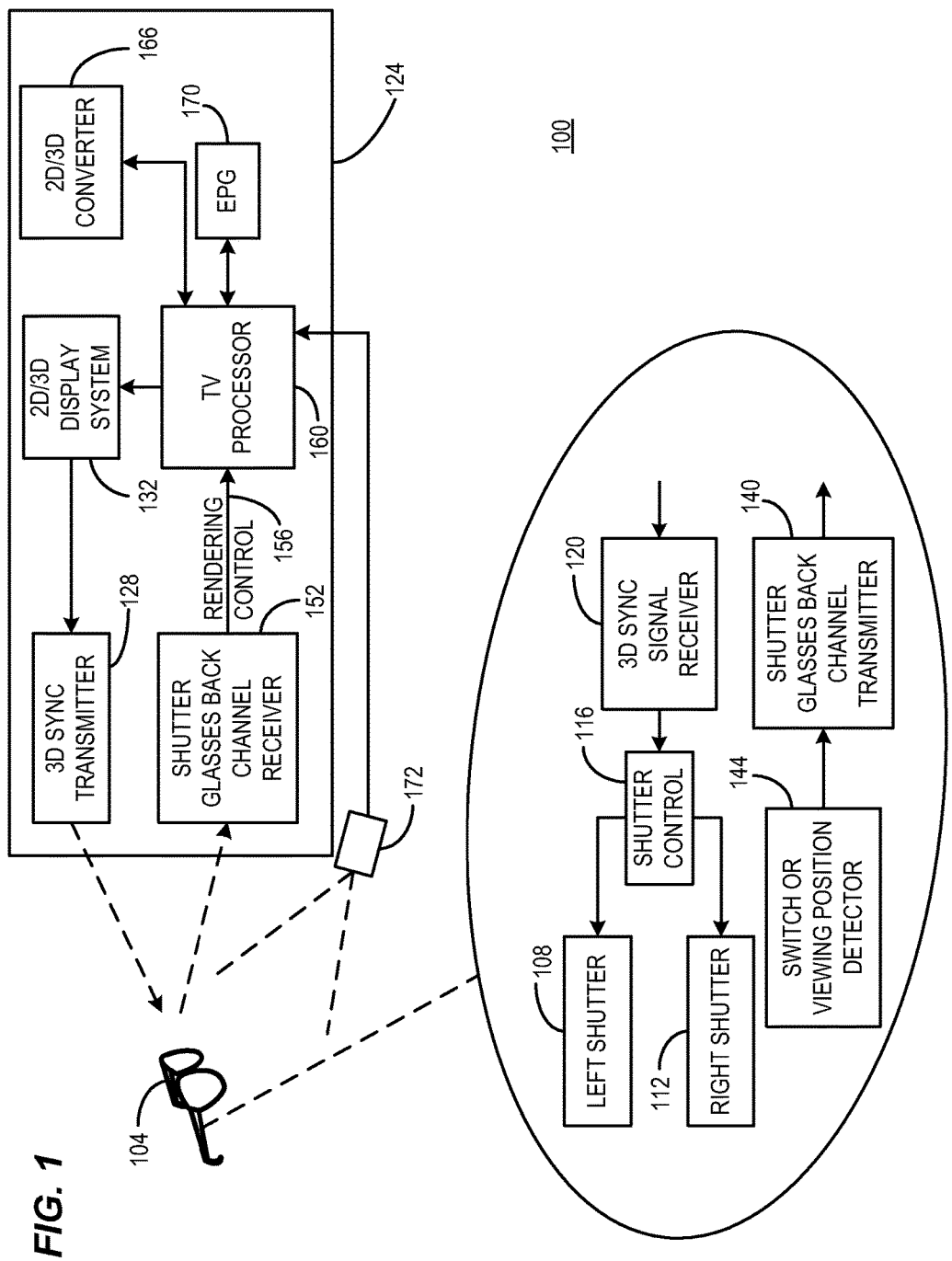
FIG. 1 is an example block diagram of an illustrative 3D TV system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

When a display is presenting 3D images, it is generally difficult to view without the use of the appropriate 3D glasses, be they passive or active. The 3D image produced generally appears blurry or doubled with position and size shifts. Hence, one would not wish to have a TV operating in a 3D display mode unless the viewer is prepared to view the images by having positioned the 3D glasses for viewing.

In current known 3D TV technology, the user manually activates the 3D mode in the display itself and then places the glasses in viewing position on his or her head. But, in accord with embodiments consistent with examples of the present invention, when the glasses are worn by the user, the glasses detect that they are being worn and signal the display to change modes. It is noted that 3D glasses are normally either passive or only receive information for synchronization (in the case of active or shutter glasses). It is not normal for the glasses to have a return communication path to the TV or a two way communication path with the TV. While passive glasses that use color or polarization are not equipped with active circuitry and thus cannot send a signal back to the display. Implementations consistent with certain embodiments consistent with the present invention can provide power to the glasses and communication with the display without regard for whether the 3D effect is created with active shutter glasses or passive 3D glasses technology.

In other implementations, cameras or other sensors forming a part of the display system can be used to detect the presence of the glasses on the viewer by use of pattern recognition, e.g., the reflective properties of the glasses themselves could be used.

In accord with certain implementations, when the glasses are worn, the glasses can detect that the user is wearing the glasses. This can be accomplished by mechanical switches, either from the flexing of the head band, extension of a cushioning band, weight of the glasses on the user's nose, optical or other sensors, or even manually when the user pushes a power button. The action of putting on the glasses is conveyed to the display, via IR or RF (e.g., Bluetooth).

In certain implementations, a non-limiting advantage of this system can be that once the display is aware that the user is wearing the 3D glasses, it can then modify its presentation to the user. The user does not have to manually set the display to a 3D operational mode. Similarly, if the user removes the glasses, the TV can automatically revert to a 2D display mode (e.g., temporarily if the user wishes to take a break).

Independent of the signaling from the active glasses, if the user selected 3D as a viewing mode, the TV set's EPG, on screen display (OSD), closed captioning (CC) and other 3D content should be listed preferentially to the viewer. That is, networked storage, accessible DLNA devices, BluRay disks in the changer, programs available on the PPV or VOD service should be listed as first if 3D, the content which is convertible to 3D is shown, and then lastly 2D only content. This automatic mode can optionally change the mode the TV's EPG and possibly OSD and CC (if enabled) so that it only lists content material that is available in a 3D version. Furthermore, the TV could also list content which is suitable for 2D to 3D conversion in the TV set. The TV could potentially access a database to verify the content's suitability and or even determine which parameters are best for 2D to 3D conversion on TVs capable of such actions. As noted previously, the TV would automatically change the mode back to 2D when the glasses are removed or turned off. It may also be of benefit for some fine tuning of the display's characteristics if it can detect the angular position of the user relative to the display.

Turning now to FIG. 1, an example 3D TV system is depicted generally as 100 where the glasses 104 are shown as shutter glasses. It should be noted that the reverse channel (or two way channel) of communication between the glasses 104 can also be implemented with passive (non-shutter) glasses such as colored or polarized glasses too, or technology can be implemented using a camera or sensors in the display can be used to detect the presence and deployment of passive 3D glasses. The term "active" as used herein, in the context of 3D glasses can be interpreted to mean that the glasses are "deployed" in the case of passive 3D glasses and "inactive" similarly means "undeployed". In this implementation, the shutter glasses 104 operate by alternately opening or closing electronic "shutters" shown as left eye shutter 108 and right eye shutter 112 under control of a shutter control circuit 116. The shutter control circuit is activated in a manner that synchronizes to a 3D sync signal received by receiver 120 from the TV 124. Such receiver can be infrared, RF or other suitable signal scheme.

The signal received at 120 is transmitted from a 3D sync transmitter 128 in TV 124 which is synchronized to the refresh rate of the TV 124's display panel such that alternately, the left and right eyes get slightly different signals that represent stereoscopic images. Such synchronization signals are generated at the TV 124 in order to both signal the shutter glasses 104 and to refresh the display within the 2D/3D display system shown broadly as 132. In this diagram, the display system is switchable from displaying a 2D image to a 3D image at 132.

In accord with example implementations consistent with the present invention, the 3D glasses such as shutter glasses 104 incorporate a transmitter 140 that transmits signals using RF or infrared, for example, back to the TV 124 that tells the TV 124 that the shutter glasses are actively in use (i.e., being worn by the user or otherwise activated). This condition is detected either manually by virtue of the user turning on the glasses manually with a switch or automatically detecting that the glasses are in place on the user's face using switch or viewing position detector 144. For purposes of this document, the term "viewing position" means that the glasses are positioned in place for use by the user, i.e., the user is wearing the glasses and the detector detects this condition. In another context, the term "angular position" is used to specify the angle of the user's face with respect to the TV or horizontal.

When the switch or detector 144 indicates that the glasses are active or in viewing position, the shutter glasses back channel transmitter 140 transmits a signal to TV 124 which is received by shutter glasses back channel receiver 152 and is indicative that the viewer is prepared for 3D viewing. The receiver 152 thus generates a rendering control signal 156 that is received by the TV processor 160 which controls the overall operation of the TV set 124 so that the processor 160 can instruct the 2D/3D display system 132 to operate in the 3D mode. It is contemplated that most content that can be rendered in 3D can also be rendered in 2D. It is also contemplated that many TVs 124 will have the ability to do a conversion of 2D content into stereoscopic 3D content (with more or less effectiveness depending upon the original content) using a converter 166. Additionally, most modern TV sets have the ability to render a graphical user interface (GUI) including an electronic program guide 170 that lists content from available sources either over the air, cable, satellite or via home servers, disc players and the like. In alternative embodiments described herein, camera or sensor 172 can detect the presence of 3D glasses in a deployed state by image recognition or other sensor process.

While not shown explicitly for purposes of simplification, an OSC system and a CC system are generally incorporated in the television system 124 and may be viewed as being carried out as a process in the TV processor 160, or in separate processor or hardware subsystems not shown.

Figure 2:
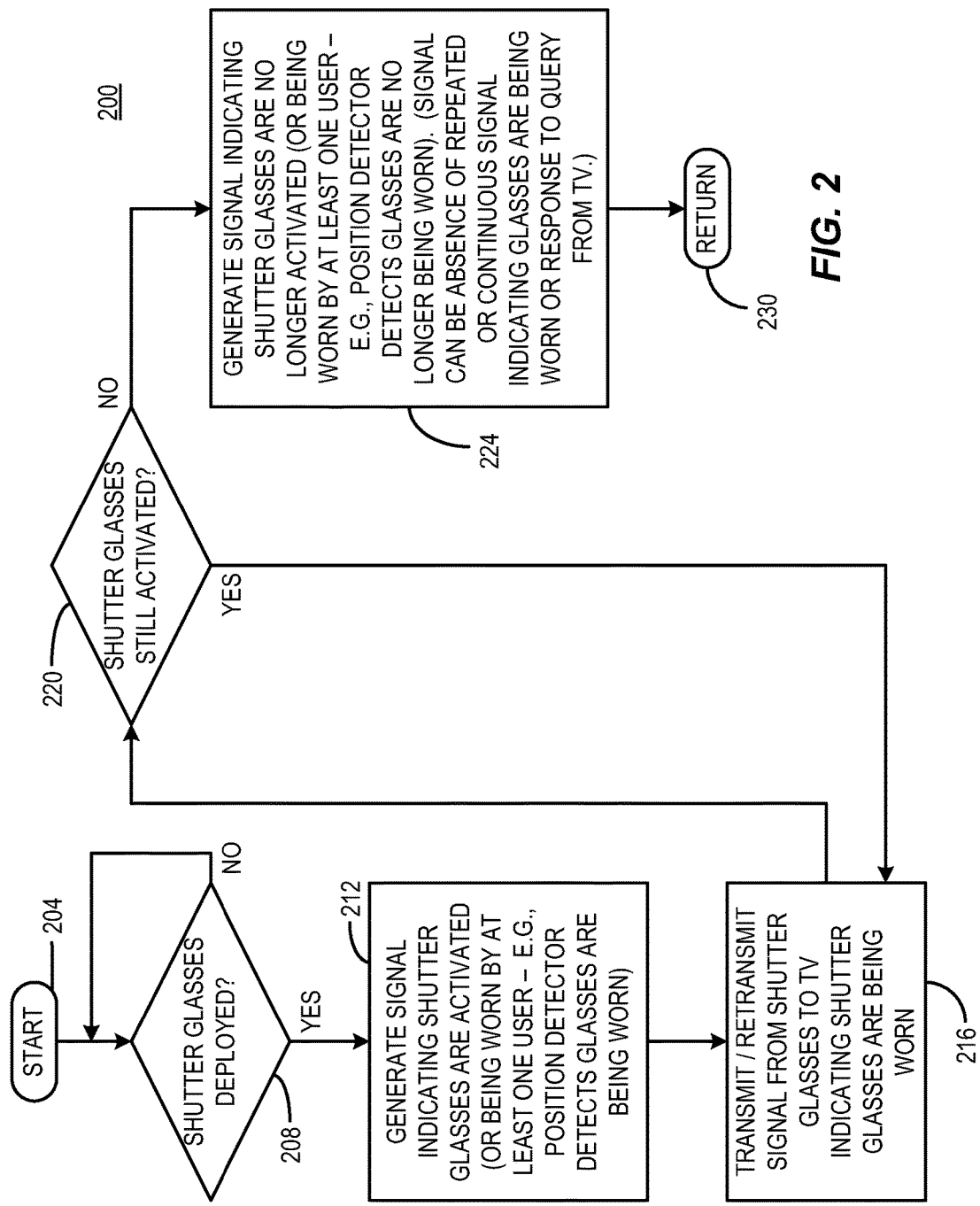
FIG. 2 is an example process carried out in the 3D glasses in a manner consistent with certain embodiments of the present invention.

Operation of the example shutter glasses is depicted in flow chart form as process 200 of FIG. 2 starting at 204. It is noted that in this example, the glasses are shutter glasses, but polarized glasses or colored glasses or other passive glasses can also operate in this manner. At 208, the shutter glasses are determined to be activated or deployed either by manual switch or by the glasses detecting the presence of the glasses in active position on the user's face using any suitable viewing position detector as previously described, or by the display system determining via a camera or sensor that the glasses have been deployed. When the condition of the glasses is determined to be active or currently being worn at 208, a signal is generated that indicates that the glasses are active (e.g., being worn) at 212 and that signal is transmitted to the TV 124 from the glasses 104 so that the TV 104 knows to operate in the 3D display mode.

Numerous signaling methods can be used within the scope of the current teachings. In the example shown, once the initial transmission is carried out at 216, as long as the shutter glasses remain active at 220, control returns to 216 where the signal is retransmitted on a periodic basis to indicate that the glasses remain active. If the glasses are removed or turned off, this condition is detected at 220 and the glasses 104 can signal the TV to revert to the 2D display mode at 224. Such signal can also be represented by the absence of a signal from the glasses 104 for a specified time. The process returns at 230.

In other implementations, the glasses 104 can be equipped with two way communication that substitutes for the one way transmitter depicted as 140 in FIG. 1, and the two way communication channel can be utilized so that the TV polls the glasses to assure that the TV continues to operate in the proper mode. In this implementation, or similar variants, receiver 152 becomes a transceiver and transmitter 140 becomes a transceiver. For brevity, this minor hardware variant is not shown but will be clearly understood by those skilled in the art upon consideration of the present teachings.

Referring now to FIG. 3, an example process 300 as would be carried out at the TV 124 in an example implementation is depicted starting at 302. At 306, the TV 124 determines if at least one set of 3D glasses is active. This presumes that the system is set up such that the image will be rendered in 3D if any one set of glasses is active. However, in other implementations, it may be desirable for the image to be rendered in 2D unless all or a specified number of glasses are active, or may require a confirmation from the user that 3D or 2D operation is desired.

As a variation of the process described in 300, block 306 can determine that a number of pairs of 3D glasses are deployed. In this case, the TV processor 160 can make a determination as to whether or not to switch between 2D and 3D modes of operation based on any suitable algorithm. For example, the switch to 3D can be based upon a majority rules vote, or based upon the presence of at least a certain number of 3D glasses being deployed.

Nevertheless, in this example, if any one set of glasses is active at 310, the rendering control signal is set to 3D rendering at 314, and otherwise is set for 2D rendering at 318. In either case, the rendering control signal is sent to the TV control processor at 322 so that the control processor can determine the active state of the 3D glasses from the rendering signal at 326. The processor then sets the 2D/3D TV display system to display in either 2D or 3D based on the state of the rendering control signal at 330. In certain implementations, as discussed above, the priority settings and/or other attributes of the EPG, OSD and/or CC can be set based on the display mode of the TV display (the rendering control signal) at 336. Once these attributes of the TV display system and the EPG are set, control returns to 306 so that the state of the 3D glasses is continuously monitored to retain the TV in the proper display state.

If the user selected 3D as a viewing mode, the TV set's EPG and other 3D content can be listed preferentially to the viewer. That is, networked storage, accessible DLNA devices, BluRay disks in the changer, programs available on the PPV or VOD service can be listed with a higher priority if the content is 3D. Content which is convertible to 3D can be prioritized second, and then lastly 2D only content can be displayed on the EPG. In another implementation, the TV's EPG can be modified when in the 3D mode so that it only lists content that is available in a 3D version. In another alternative, the EPG can further list content which is suitable for 2D to 3D conversion in the TV set. The TV could potentially access a database to verify the content's suitability and or even determine which parameters are best for 2D to 3D conversion on TVs capable of such actions.

With reference to FIG. 4, the 3D experience may also be of benefit for some fine tuning of the display's characteristics if it can detect the angular position of the user relative to the display. The process depicted as 400 can be carried out if the 3D glasses can further provide information to the TV regarding the viewer's position with respect to the TV. This can be both in terms of the viewer's seating position as well as any tilt angle of the viewer's head. This information is received at 404 and the image can be fine tuned to adjust for optimum 3D effect for a single viewer or a compensated display that optimizes the 3D effect for all viewers at 408. The process continually monitors the viewer(s) position and/or head tilts to make picture adjustments to optimize the viewing experience.

It is noted that the various components of the television system described can either be integrated within the television set or may reside as a separate accessory forming a part of the television display system (which, as used herein, is also intended to embrace a television set which contains all components).

Thus, in accord with certain implementations, a television has a television display system capable of switchably displaying audio visual (A/V) content in either a three dimensional (3D) stereoscopic display mode or a two dimensional (2D) non-stereoscopic display mode. Content viewed on the display in the 3D display mode is presented in a manner that utilizes a set of 3D stereoscopic glasses for viewing to produce a three dimensional effect. A circuit determines if a set of 3D glasses is active or inactive. A controller switches the television display system to either operate in the 3D display mode in the event the 3D glasses are active or to operate in the 2D display mode if the 3D glasses are inactive.

In certain implementations, the set of 3D glasses includes one of a plurality of sets of 3D glasses, and wherein the controller places the television display system in the 3D display mode if any one or more of the plurality of 3D glasses is active. In certain implementations, the set of 3D glasses includes one of a plurality of sets of 3D glasses, and wherein the controller places the television display system in the 3D display mode if all of the plurality of 3D glasses are active. In certain implementations, the set of 3D glasses includes one of a plurality of sets of 3D glasses, and wherein the controller places the television display system in the 3D display mode if a defined number of the plurality of 3D glasses are active. In certain implementations, a synchronization transmitter transmits synchronization signals to the 3D glasses in order to control opening and closing of shutters therein. In certain implementations, the 3D glasses are deemed active if they are being worn by a user, as indicated by a signal received from the 3D glasses. In certain implementations, the 3D glasses are deemed active if they are turned on by a user, as indicated by a signal received from the 3D glasses. In certain implementations, the 3D glasses are deemed active if they are detected by a camera or sensor forming a part of the television display system. In certain implementations, an electronic program guide (EPG) is reconfigured based upon whether the television display system is operating in the 2D or 3D display mode. In certain implementations, the EPG is reconfigured to prioritize 3D content above 2D content when the television display system is operating in the 3D display mode. In certain implementations, the EPG is reconfigured to prioritize 3D content above 2D content that can be converted to 3D content when the television display system is operating in the 3D display mode.

In certain implementations, the circuit that determines if the 3D glasses are active makes this determination based upon receipt of a wireless signal from the 3D glasses, and where the wireless signal comprises at least one of a radio frequency (RF) signal and an infrared (IR) signal. In certain implementations, a 2D to 3D converter circuit that converts 2D content to 3D content when the television display system is operating in the 3D display mode. In certain implementations, the circuit that determines if a set of 3D glasses is active or inactive determines a number of active glasses and a number of viewers, and the controller determines whether the television display system is to operate in a 2D or 3D mode makes the determination based upon the number of active glasses and the number of viewers detected. In certain implementations, the television has an on-screen display (OSD), wherein the OSD is reconfigured based upon whether the television display system is operating in the 2D or 3D display mode. In certain implementations, the television has a closed captioning system (CC), wherein the CC is reconfigured based upon whether the television display system is operating in the 2D or 3D display mode.

A television consistent with certain implementations has a television display system capable of switchably displaying audio visual (A/V) content in either a three dimensional (3D) stereoscopic display mode or a two dimensional (2D) non-stereoscopic display mode. Content viewed on the display in the 3D display mode is presented in a manner that utilizes a set of 3D stereoscopic glasses for viewing to produce a three dimensional effect. A circuit determines if a set of 3D glasses is active or inactive. A controller switches the television display system to either operate in the 3D display mode in the event the 3D glasses are active or to operate in the 2D display mode if the 3D glasses are inactive. A synchronization transmitter transmits synchronization signals to the 3D glasses in order to control opening and closing of shutters therein. The 3D glasses are deemed active if they are being worn by a user, as indicated by a signal received from the 3D glasses. An electronic program guide (EPG) is reconfigured based upon whether the television display system is operating in the 2D or 3D display mode so as to prioritize 3D content above 2D content when the television display system is operating in the 3D display mode. In certain implementations, the EPG is further reconfigured to prioritize 3D content above 2D content that can be converted to 3D content when the television display system is operating in the 3D display mode.

In certain implementations, the circuit that determines if the 3D glasses are active makes this determination based upon receipt of a wireless signal from the 3D glasses, and where the wireless signal comprises at least one of a radio frequency (RF) signal and an infrared (IR) signal. In certain implementations, a 2D to 3D converter circuit converts 2D content to 3D content when the television display system is operating in the 3D display mode. In certain implementations, the 3D glasses are deemed active if they are detected by a camera or sensor forming a part of the television display system. In certain implementations, the circuit that determines if a set of 3D glasses is active or inactive determines a number of active glasses and a number of viewers, and the controller determines whether the television display system is to operate in a 2D or 3D mode makes the determination based upon the number of active glasses and the number of viewers detected.

A method of operation of three dimensional (3D) stereoscopic television display system consistent with certain implementations involves installing a set of 3D glasses on a viewer to cause the set of 3D glasses to enter an active operational mode; and at the 3D glasses, emitting a signal to the television display system that causes the television display system to switch from a 2D display mode to a 3D display mode.

In certain implementations, the method further involves receiving a synchronization signal from the television display system at the 3D glasses in order to control opening and closing of shutters therein. In certain implementations, the television has an electronic program guide (EPG), wherein the EPG is reconfigured based upon whether the television display system is operating in the 2D or 3D display mode. In certain implementations, the EPG is reconfigured to prioritize 3D content above 2D content when the television display system is operating in the 3D display mode. In certain implementations, the EPG is reconfigured to prioritize 3D content above 2D content that can be converted to 3D content when the television display system is operating in the 3D display mode.

In certain implementations, the 3D glasses emit a wireless signal that comprises at least one of a radio frequency (RF) signal and an infrared (IR) signal in order to cause the television display system to switch between 2D and 3D display modes. In certain implementations, the television has a 2D to 3D converter circuit that converts 2D content to 3D content when the television display system is operating in the 3D display mode in response to the emitted signal from the 3D glasses. In certain implementations, the 3D glasses are deemed active if they are detected by a camera or sensor forming a part of the display system.

A method of operation of three dimensional (3D) stereoscopic television display system consistent with certain implementations involves turning on a set of 3D glasses to cause the set of 3D glasses to enter an active operational mode; and at the 3D glasses, emitting a signal to the television that causes the television display system to switch from a 2D display mode to a 3D display mode. In certain implementations, the method further involves receiving a synchronization signal from the television display system at the 3D glasses in order to control opening and closing of shutters therein. In certain implementations, the television has an electronic program guide (EPG), wherein the EPG is reconfigured based upon whether the television display system is operating in the 2D or 3D display mode. In certain implementations, the EPG is reconfigured to prioritize 3D content above 2D content when the television display system is operating in the 3D display mode. In certain implementations, the EPG is reconfigured to prioritize 3D content above 2D content that can be converted to 3D content when the television display system is operating in the 3D display mode. In certain implementations, the 3D glasses emit a wireless signal that comprises at least one of a radio frequency (RF) signal and an infrared (IR) signal in order to cause the television display system to switch between 2D and 3D display modes. In certain implementations, the television has a 2D to 3D converter circuit that converts 2D content to 3D content when the television display system is operating in the 3D display mode in response to the emitted signal from the 3D glasses.

A method of operation of three dimensional (3D) stereoscopic television display system consistent with certain implementations involves deploying a set of 3D glasses to establish that the 3D glasses are to be considered to be in an active mode; detecting the deployment of the 3D glasses at a television display system; and as a result of the detecting, causing the television display system to switch from a 2D display mode to a 3D display mode.

In certain implementations, the method further involves receiving a synchronization signal from the television display system at the 3D glasses in order to control opening and closing of shutters therein. In certain implementations, the television display system has an electronic program guide (EPG), wherein the EPG is reconfigured based upon whether the television display system is operating in the 2D or 3D display mode. In certain implementations, the EPG is reconfigured to prioritize 3D content above 2D content when the television display system is operating in the 3D display mode. In certain implementations, the EPG is reconfigured to prioritize 3D content above 2D content that can be converted to 3D content when the television display system is operating in the 3D display mode. In certain implementations, the 3D glasses emit a wireless signal that comprises at least one of a radio frequency (RF) signal and an infrared (IR) signal in order to cause the television to switch between 2D and 3D display modes. In certain implementations, the television has a 2D to 3D converter circuit that converts 2D content to 3D content when the television display system is operating in the 3D display mode in response to the emitted signal from the 3D glasses. In certain implementations, the 3D glasses are deemed deployed if they are detected by a camera or sensor forming a part of the television display system. In certain implementations, the television has an on-screen display (OSD), wherein the OSD is reconfigured based upon whether the television display system is operating in the 2D or 3D display mode. In certain implementations, the television has an closed captioning system (CC), wherein the CC is reconfigured based upon whether the television display system is operating in the 2D or 3D display mode.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of operation of a three dimensional (3D) display system in a 2D display mode or a 3D display mode, comprising:
   receiving a signal that indicates that at least one set of 3D glasses is in an active state; and
   configuring the display system to a 3D display mode responsive to a determination that the signal indicates that the at least one set of 3D glasses is in the active state; and
   configuring an electronic program guide (EPG) presentable on the display system, wherein the EPG comprises a listing of content that is available for play on the display system, and where the listing of content in the EPG is automatically presented in a first configuration based upon a determination that the display system is operating in a 2D display mode, the listing of content in the EPG being automatically presented in a second configuration different from the first configuration based on a determination that the display system is operating in a 3D display mode, the EPG being reconfigured based on a determination that the display system is operating in a 3D display mode to prioritize 3D content above 2D content responsive to the display system operating in the 3D display mode.

2. The method according to claim 1, further comprising transmitting a synchronization signal from the display system to the 3D glasses in order to control opening and closing of shutters therein.

3. The method according to claim 1, where the EPG is reconfigured to prioritize 3D content above 2D content that can be converted to 3D content responsive to the display system operating in the 3D display mode.

4. The method according to claim 1, where the signal is from a transmitter residing within the 3D glasses and comprises at least one of a radio frequency (RF) signal and an infrared (IR) signal in order to cause the display system to switch between 2D and 3D display modes.

5. The method according to claim 1, where the display system has a 2D to 3D converter circuit that converts 2D content to 3D content when the display system is operating in the 3D display mode in response to the emitted signal from the 3D glasses.

6. The method according to claim 1, where the display system is configured to present closed captioning system (CC), where the CC is reconfigured based upon whether the display system is operating in the 2D or 3D display mode.

7. An apparatus, comprising:
   at least one processor;
   at least one storage comprising instructions accessible to the at least one processor for:
   receiving a signal that indicates that at least one set of 3D glasses is in an active state;
   configuring a display system to a 3D display mode responsive to a determination that the signal indicates that the at least one set of 3D glasses is in the active state; and
   configuring an electronic program guide (EPG) presentable on the display system, wherein the EPG comprises a listing of content that is available for play on the display system, and where the listing of content in the EPG is automatically presented in a first configuration based upon a determination that the display system is operating in a 2D display mode, the listing of content in the EPG being automatically presented in a second configuration different from the first configuration based on a determination that the display system is operating in a 3D display mode, the EPG being reconfigured based on a determination that the display system is operating in a 3D display mode to prioritize 3D content above 2D content responsive to the display system operating in the 3D display mode.

8. The apparatus of claim 7, wherein the instructions are executable for transmitting a synchronization signal from the display system to the 3D glasses in order to control opening and closing of shutters therein.

9. The apparatus of claim 7, comprising at least one display configured to communicate with the at least one processor.

10. The apparatus of claim 7, wherein the instructions are executable for:
reconfiguring the EPG to prioritize 3D content above 2D content that can be converted to 3D content responsive to the display system operating in the 3D display mode.

11. The apparatus of claim 7, wherein the instructions are executable for receiving the signal from a transmitter associated with the 3D glasses and which signal comprises at least one of a radio frequency (RF) signal and an infrared (IR) signal in order to cause the display system to switch between 2D and 3D display modes.

12. The apparatus of claim 7, comprising a 2D to 3D converter circuit that converts 2D content to 3D content when the display system is operating in the 3D display mode in response to the emitted signal from the 3D glasses.

13. The apparatus of claim 7, wherein the display system is configured to present closed captioning system (CC), wherein the instructions are executable for reconfiguring the CC based upon whether the display system is operating in the 2D or 3D display mode.

14. A device, comprising:
at least one computer memory that is not a transitory signal and that comprises instructions executable by at least one processor for:
receiving a signal that indicates that at least one set of 3D glasses is in an active state;
configuring a display system to a 3D display mode responsive to a determination that the signal indicates that the at least one set of 3D glasses is in the active state; and
configuring an electronic program guide (EPG) presentable on the display system, wherein the EPG comprises a listing of content that is available for play on the display system, and where the listing of content in the EPG is automatically presented in a first configuration based upon a determination that the display system is operating in a 2D display mode, the listing of content in the EPG being automatically presented in a second configuration different from the first configuration based on a determination that the display system is operating in a 3D display mode, the EPG being reconfigured based on a determination that the display system is operating in a 3D display mode to prioritize 3D content above 2D content responsive to the display system operating in the 3D display mode.

15. The device of claim 14, wherein the instructions are executable for transmitting a synchronization signal from the display system to the 3D glasses in order to control opening and closing of shutters therein.

16. The device of claim 14, comprising:
the at least one processor; and
at least one display configured to communicate with the at least one processor.

17. The device of claim 14, wherein the instructions are executable for:
reconfiguring the EPG to prioritize 3D content above 2D content that can be converted to 3D content responsive to the display system operating in the 3D display mode.

18. The device of claim 14, wherein the instructions are executable for receiving a signal from a transmitter residing within the 3D glasses and which signal comprises at least one of a radio frequency (RF) signal and an infrared (IR) signal in order to cause the display system to switch between 2D and 3D display modes.

19. The device of claim 14, comprising a 2D to 3D converter circuit that converts 2D content to 3D content when the display system is operating in the 3D display mode in response to the emitted signal from the 3D glasses.

20. The device of claim 14, wherein the display system is configured to present closed captioning system (CC), wherein the instructions are executable for reconfiguring the CC based upon whether the display system is operating in the 2D or 3D display mode.

* * * * *